US010260532B2

United States Patent
Jiao et al.

(10) Patent No.: US 10,260,532 B2
(45) Date of Patent: Apr. 16, 2019

(54) INTELLIGENT LOAD-SENSING ELECTRO-HYDROSTATIC ACTUATOR

(71) Applicant: BEIHANG UNIVERSITY, Haidian District, Beijing (CN)

(72) Inventors: Zongxia Jiao, Haidian District (CN); Yaoxing Shang, Haidian District (CN); Shuai Wu, Haidian District (CN); Zengning Song, Haidian District (CN); Weiyi Hao, Haidian District (CN)

(73) Assignee: BEIHANG UNIVERSITY (CN)

( * ) Notice: Subject to any disclaimer, the term of this patent is extended or adjusted under 35 U.S.C. 154(b) by 156 days.

(21) Appl. No.: 15/414,166

(22) Filed: Jan. 24, 2017

(65) Prior Publication Data

US 2017/0130747 A1     May 11, 2017

Related U.S. Application Data

(63) Continuation of application No. PCT/CN2016/076180, filed on Mar. 12, 2016.

(30) Foreign Application Priority Data

Mar. 18, 2015   (CN) .......................... 2015 1 0120016

(51) Int. Cl.
F15B 13/04     (2006.01)
F15B 13/044    (2006.01)
(Continued)

(52) U.S. Cl.
CPC .......... *F15B 13/0446* (2013.01); *F15B 7/006* (2013.01); *F15B 11/08* (2013.01);
(Continued)

(58) Field of Classification Search
CPC .... F15B 11/08; F15B 13/028; F15B 13/0417; F15B 13/0446; F15B 2211/20553; F15B 2211/3052
See application file for complete search history.

(56) References Cited

U.S. PATENT DOCUMENTS 4,620,416 A * 11/1986 Yip .......................... B62D 5/09
                                                       137/596.13
4,756,157 A *  7/1988 Appel ................... F16H 61/433
                                                          60/444
(Continued)

FOREIGN PATENT DOCUMENTS

CN        102588382        7/2012
CN        104047931        9/2014
(Continued)

OTHER PUBLICATIONS

International Search Report corresponding to PCT/CN2016/076180, dated Jun. 16, 2016, 4 pages.

*Primary Examiner* — Thomas E Lazo
(74) *Attorney, Agent, or Firm* — Calfee, Halter & Griswold LLP

(57) ABSTRACT

A smart load-sensing EHA, comprising a variable displacement hydraulic pump, a symmetrical hydraulic cylinder, a feedback module, a pressure-following valve and an execution mechanism. The symmetrical hydraulic cylinder includes a symmetrical plunger, a first cylinder and a second cylinder separated by the plunger. The variable displacement hydraulic pump includes an oil inlet and an oil outlet. An output of the feedback module is to output a greater one of pressures at the first input and the second input to the execution mechanism. The pressure-following valve is connected between the output of the feedback module and an input end of the execution mechanism to reduce an instantaneous flow input to the input end of the execution mecha- (Continued)

nism and adjust pressure at the input end thereof. The execution mechanism is to receive an output of the feedback module and generate signal for changing displacement of the variable displacement hydraulic pump.

13 Claims, 5 Drawing Sheets

(51) Int. Cl.
    *F15B 11/08*     (2006.01)
    *F15B 13/02*     (2006.01)
    *F15B 7/00*     (2006.01)
    *F16D 48/02*     (2006.01)

(52) U.S. Cl.
    CPC ........ *F15B 13/028* (2013.01); *F15B 13/0417* (2013.01); *F15B 2211/20515* (2013.01); *F15B 2211/20546* (2013.01); *F15B 2211/20553* (2013.01); *F15B 2211/20561* (2013.01); *F15B 2211/27* (2013.01); *F15B 2211/275* (2013.01); *F15B 2211/6651* (2013.01); *F15B 2211/7052* (2013.01); *F15B 2211/7054* (2013.01); *F16D 48/02* (2013.01); *F16D 2048/0248* (2013.01)

(56) References Cited

U.S. PATENT DOCUMENTS

| | | | | |
|---|---|---|---|---|
| 5,265,422 | A  * | 11/1993 | Watts | F16H 61/40 417/218 |
| 7,987,668 | B2 * | 8/2011 | Kakino | F15B 15/18 60/452 |
| 8,020,379 | B2 * | 9/2011 | Kakino | F15B 18/00 244/78.1 |
| 2008/0236156 | A1 * | 10/2008 | Kakino | F15B 15/18 60/443 |
| 2009/0165457 | A1 | 7/2009 | Kakino et al. | |

FOREIGN PATENT DOCUMENTS

CN            104728196       6/2015
JP              4169913         10/2008

* cited by examiner

INTELLIGENT LOAD-SENSING ELECTRO-HYDROSTATIC ACTUATOR

CROSS-REFERENCE TO RELATED APPLICATIONS

The present application is a continuation of International Application No. PCT/CN2016/076180, filed on Mar. 12, 2016, which claims priority to Chinese Patent Application No. 201510120016.0, filed on Mar. 18, 2015, the contents of both of which are incorporated herein by reference in their entireties.

TECHNICAL FIELD

The present invention relates to the technical field of electro-hydrostatic actuator (EHA), and more particularly to a smart load-sensing EHA.

BACKGROUND

An EHA, as a highly integrated local hydraulic actuator, is an execution mechanism in a power-by-wire actuating system of a more electric aircraft. Compared with a traditional hydraulic actuating system, the EHA has advantages such as small volume, light weight, and high efficiency, and is a hot research today. Furthermore, a load sensing way can decrease energy loss and reduce heat of an electrical motor.

At present, internationally, an EHA of fixed displacement variable speed sees wider application in a power-by-wire actuating system of an aircraft because it is light and has a simple structure. However, the system suffers a problem in radiation because of highly integrated design such that the EHA cannot work for a longer time under heavy load with low motor efficiency, large current and severe heating.

A solution to this problem at present is to take radiation of the system into consideration at the beginning of designing the system on the one hand, and to use a variable displacement pump to change a transmission ratio of the system by varying the displacement of the pump so as to improve power condition of the motor and reduce radiation on the other hand. While a variable displacement execution mechanism of the variable displacement pump mostly employs a servo valve to achieve variable displacement by controlling a hydraulic cylinder to drive a variable displacement mechanism of the pump, or an electrical motor actuator (EMA) to achieve variable displacement by driving the variable displacement mechanism of the pump. These two ways are complicated in structure and increases failure rate of the system.

A load sensing control system exhibits lower power loss and higher efficiency than a traditional hydraulic system. As high efficiency and low power loss means fuel saving and relatively low heating of the hydraulic system, a load sensing way is introduced into the EHA by some research centers. However, currently available load-sensing EHAs mostly use a servo valve to achieve direction change and control. The servo valve generates a large amount of heat during operation, which is not favorable for reducing heat of the system. As a result, in order to reduce heat of the system and mitigate energy loss, the present invention provides a novel load-sensing EHA energy saving device.

SUMMARY

A brief summary of the present invention will be given below for basic understanding of some aspects of the present invention. It should be understood that the summary is not an exhausting illustration of the invention but nor is it intended to determine a key part or important part of the invention, nor is it intended to define the protection scope of the invention. The purpose is to propose some concepts in a simplified manner to serve later as a preamble of the more detailed description.

A primary objective of the present invention is to provide a smart load-sensing EHA, which can reduce radiation of an entire system to minimum energy consumption thereof.

According to an aspect of the invention, a smart load-sensing EHA comprises a variable displacement hydraulic pump, a symmetrical hydraulic cylinder, a feedback module, a pressure-following valve and an execution mechanism.

The symmetrical hydraulic cylinder includes a symmetrical plunger, a first cylinder and a second cylinder separated by the plunger.

The variable displacement hydraulic pump includes an oil inlet and an oil outlet connected with the first cylinder and the second cylinder, respectively.

The feedback module includes a first input, a second input and an output, the first input and the second input being connected with the first cylinder and the second cylinder, respectively, the output being used to output a greater one of the pressures at the first input and the second input to the execution mechanism.

The pressure-following valve is connected between the output of the feedback module and an input end of the execution mechanism to reduce an instantaneous flow input to the input end of the execution mechanism.

The input end of the execution mechanism is connected to the output of the feedback module, and the output end of the execution mechanism is connected to the variable displacement hydraulic pump. The execution mechanism is used to receive an output of the feedback module and generate a signal for changing a displacement of the variable displacement hydraulic pump.

Thanks to the smart load-sensing EHA of the present invention, the displacement of the variable displacement hydraulic pump can be adjusted quantitatively by controlling an output pressure of the pressure-following valve to reduce radiation and energy consumption of the entire system.

BRIEF DESCRIPTION OF DRAWINGS

An easier understanding of the above and other objectives, features and benefits of the present invention may be acquired by referring to the follow description taken in conjunction with the accompanying drawings in which the components are only intended to show the principle of the present invention and in which identical or similar technical features or components are indicated by identical or similar reference numbers.

DESCRIPTION OF EMBODIMENTS

Figure 1:
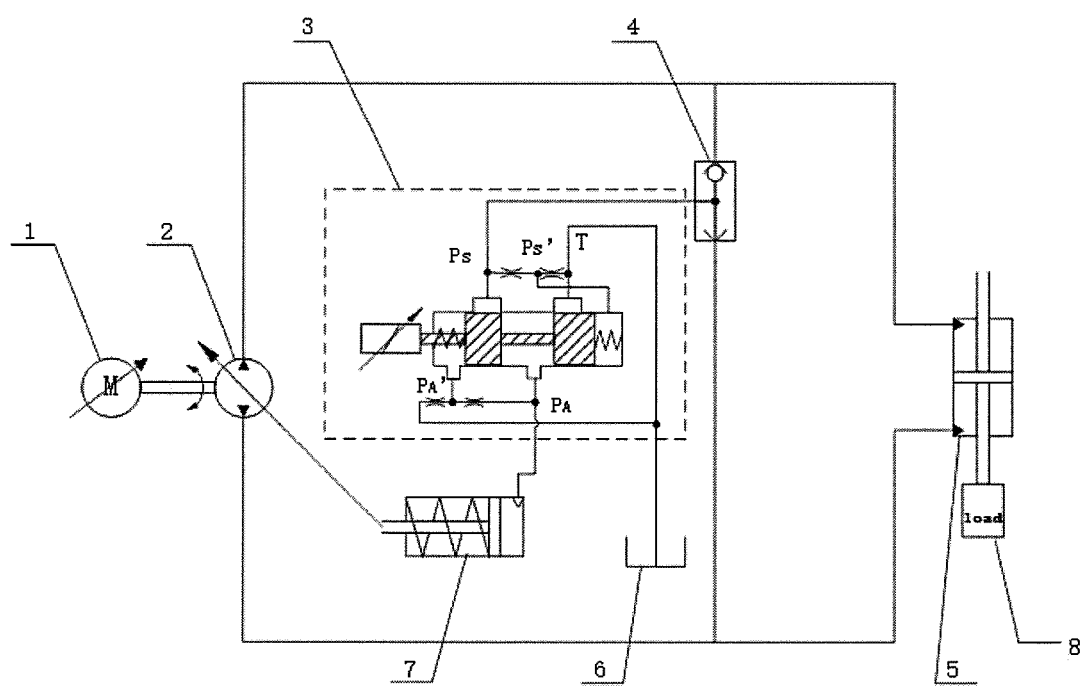
FIG. 1 is a structural view of an embodiment of a smart load-sensing EHA of the present invention.

The embodiments will be illustrated below with reference to the drawings. An element and a feature described in a figure or an embodiment of the present invention may be combined with one or more elements and features described in other figures and embodiments. It should be noted that for the sake of clarity, the components as well as expressions and depictions irrelevant to the present invention and known by an ordinary skilled in the art are omitted in the drawings and description.

FIG. 1 shows a structural view of an embodiment of a smart load-sensing EHA of the present invention.

In this embodiment, the smart load-sensing EHA comprises a variable displacement hydraulic pump 2, a symmetrical hydraulic cylinder 5, a feedback module 4, a pressure-following valve 3 and an execution mechanism 7.

wherein the symmetrical hydraulic cylinder 5 includes a symmetrical plunger and a first cylinder and a second cylinder separated by the plunger. The plunger of one of the first and second cylinders is connected with a load 8 that is driven by the plunger to move.

The variable displacement hydraulic pump 2 includes an oil inlet and an oil outlet which are connected to the first cylinder and the second cylinder, respectively. In an embodiment, the oil inlet and the oil outlet of the variable displacement hydraulic pump 2 are exchangeable according to real conditions.

The feedback module 4 includes a first input, a second input and an output. The first input and the second input are connected with the first cylinder and the second cylinder, respectively, the output being used to output a greater one of the pressures of the first input and the second input to the execution mechanism. In other words, the pressure of the first input of the feedback module 4 is equal to that of the first cylinder, and the pressure of the second input is equal to that of the second cylinder.

The pressure-following valve 3 is connected between the output of the feedback module 4 and an input end of the execution mechanism 6 to reduce an instantaneous flow input to the input end of the execution mechanism 6, which means that the pressure at the input end of the execution mechanism 6 is adjusted.

The input end of the execution mechanism 6 is connected to the output end of the pressure-following valve 3, and the output end of the execution mechanism 6 is connected to the variable displacement hydraulic pump 2. The execution mechanism 6 is used to receive an output of the feedback module 4 and generate a signal for changing a displacement of the variable displacement pump.

In an embodiment, the feedback module 4 may be a shuttle valve, the structural characteristic of which determines that an input port with greater pressure of two input ports is connected to the output for outputting. In addition, the shuttle valve has less heat and higher efficiency because it does not have a directional mechanism but determines output pressure depending on the pressure at the input ports.

In an embodiment, the execution mechanism 6 may be a single-acting hydraulic cylinder.

The single-acting cylinder includes a cylinder body, an asymmetrical plunger and a spring inside the cylinder body. The asymmetrical plunger includes a shaft and a plug perpendicular to each other. The plug fits with an inner wall of the cylinder body to form a cavity having an opening connected to an output end of a damping orifice.

The spring is arranged inside a cavity with a first shaft of the single-acting hydraulic cylinder and has an elastic direction overlapping with an axis of the first shaft, and works in a non-tensile state. One end of the shaft is fixedly connected with the plug and the other end is connected with the variable displacement hydraulic pump to change a displacement of the variable displacement hydraulic pump according to a joint force of a pressure applied to the plug by liquid into the cavity and a pressure applied to the plug by the spring.

In an embodiment, the variable displacement hydraulic pump 2 may include a swashplate having an inclination angle in positive correlation with the displacement of the variable displacement hydraulic pump 2, wherein the inclination angle is 0° when the swashplate is vertical. In an embodiment, the displacement of the variable displacement hydraulic pump 2 is in proportion to a tangent value of the inclination angle of the swashplate.

A shaft of the single-acting hydraulic cylinder 6 is connected to the swashplate of the variable displacement hydraulic pump 2 to change the displacement of the variable displacement hydraulic pump 2 by changing the inclination angle of the swashplate.

The smart load-sensing EHA further includes an adjustable-speed motor 1 which is connected to the variable displacement hydraulic pump 2 to drive the latter to rotate.

When the smart load-sensing EHA in the present embodiment is in operation, the adjustable-speed motor 1 drives the variable displacement hydraulic pump 2 to rotate. Variation of load pressure is introduced to the single-acting cylinder 7 by means of the shuttle valve 4 and the pressure-following valve 3. The pressure output to the single-acting cylinder 7 is controlled by controlling the pressure-following valve. The single-acting cylinder 7 then adjusts the inclination angle of the swashplate of the variable displacement hydraulic pump 2 as a function of outlet pressure of the pressure-following valve 3 to adjust the displacement thereof. Meanwhile, the speed of the motor is adjusted to maintain the power of the entire smart load-sensing EHA.

In this case, the heat of the adjustable-speed motor can be reduced because of decrease in the displacement of the variable displacement hydraulic pump 2, increase in rotation speed of the adjustable-speed motor 1 as well as decrease in output current.

Figure 2:
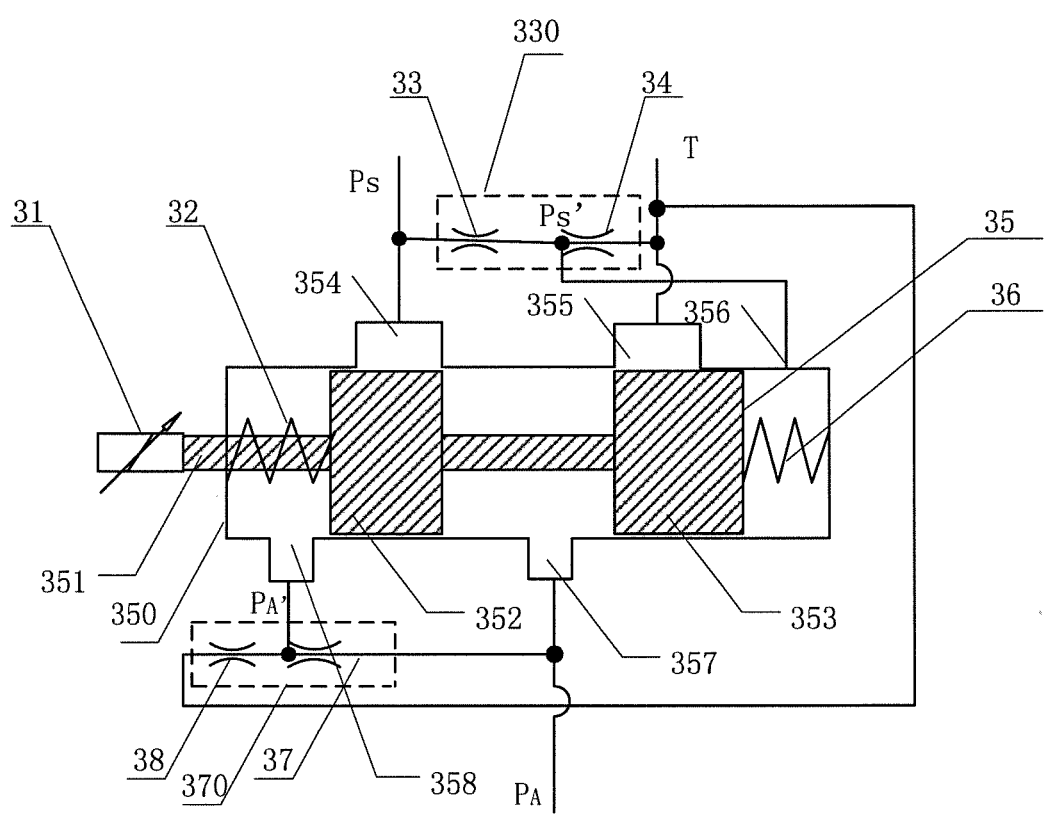
FIG. 2 is a structural view of an embodiment of a pressure-following valve shown in FIG. 1.

FIG. 2 is a structural view of an embodiment of the pressure-following valve 3 of the smart load-sensing EHA in the present invention.

In this embodiment, the pressure-following valve includes a housing 350, a spool 35 located in the housing 350 and a first hydraulic half-bridge 330, wherein the spool 35 is an asymmetrical plunger and includes a shaft 351 extending beyond the housing 350 and a plug fixedly connected with the shaft 351 and located inside the housing 350.

The plug is provided with a circumferential groove which divides the plug into a first plug body 352 and a second plug body 353. A clearance-fit is created by the first plug body 352, the second plug body 353 and the housing 350.

The spool 35 divides the housing 350 into a rod chamber containing the shaft 351, a middle chamber between the first plug body 352 and the second plug body 353, and a rodless chamber.

The housing 350 is provided with a first inlet 354, a second inlet 355, and a third inlet 356.

The first inlet 354 is connected to an input end of the shuttle valve 4 to receive pressure input of the shuttle valve 4, and the second inlet 355 is connected to an external tank T. In this way, the pressure-following valve of the present invention can exhaust excessive oil to the external tank T via the second inlet 355.

The first inlet 354 is connected with a first end of the first hydraulic half-bridge 330, the second inlet 355 being connected with a second end thereof, the third inlet 356 being connected with an intermediate end thereof to input external input pressure into the rodless chamber after pressure depressure.

The housing 350 is also provided with an outlet 357 connected to the input end of the execution mechanism 6 and a feedback port 358 for feeding back the pressure of the outlet 357 to the rod chamber.

In an embodiment, the first hydraulic half-bridge 330 may include a first throttling orifice 33 and a second throttling orifice 34 connected in series. The first inlet 354 may be connected to a first end of the first throttling orifice 33, and the third inlet 356 may be connected to a second end of the first throttling orifice 33 and a first end of the second throttling orifice 34. The second inlet 355 is connected to a second end of the second throttling orifice 34. That is to say, the second inlet 355 and the second throttling orifice 34 are connected with the external tank T simultaneously, and the pressure at the second inlet 355 and the second end of the second throttling orifice 34 is zero.

In another embodiment, the pressure-following valve 3 may further include a second hydraulic half-bridge 370.

The second hydraulic half-bridge 370 may include a third throttling orifice 37 and a fourth throttling orifice 38 connected in series. A first end of the third throttling orifice 37 may be connected with the outlet 357. A second end of the third throttling orifice 37 and a first end of the fourth throttling orifice 38 are connected with a feedback port 358. A second end of the fourth throttling orifice 38 is connected with the external tank T such that an pressure at the second end of the fourth throttling orifice 38 is zero.

The pressure-following valve 3 further includes a drive device 31 for applying an axial force to the shaft 351 in an axial direction of the spool and adjusting an output pressure of the outlet based on the axial force.

In an embodiment, the drive device 31 may be, e.g. a proportional electromagnet, a voice coil motor and the like.

As a preferred embodiment, the pressure-following valve may further include a first spring 32 arranged in the rod chamber and a second spring 36 arranged in the rodless chamber. The first spring 32 and the second spring 36 have an elastic direction overlapping with an axis of the spool and operate in a non-tensile state.

The following formula is formed in the case of stable equilibrium regardless of a hydrodynamic force, given that a thrust of the drive device 31 is FM and a joint force of the first spring 32 and the second spring 36 is FK, $$FM-FK=Ps'S1-PA'S2=PsS1/K1-PAS2/K2,$$

wherein S1 and S2 represent effective acting areas of Ps and PA' respectively. In other words, S1 is a sectional area of the second plug body 353 in the rodless chamber, and S2 is a difference between the sectional area of the first plug body 352 of the rod chamber and a sectional area of the shaft 351; K1 is a depressure ratio of the first hydraulic half-bridge 330, and K2 is a depressure ratio of the second hydraulic half-bridge 370.

A spring force may be omitted because of small displacement of the spool. The following formula is formed in a stable equilibrium condition given that S1/K1=S2/K2:

$$FM=PsS1/K1-PAS2/K2=(Ps-PA)S1/K1=(Ps-PA)S2/K2.$$

Once the thrust FM of the drive device 31 is set, approximately an inlet and outlet pressure difference Ps–PA can be controlled to further control a valve outlet pressure PA.

As a preferred embodiment, the inlet and outlet pressure difference Ps–PA is not in proportion to the thrust FM of the drive device 31 due to asymmetrical acting areas of two ends of the spool 35, such that controlling difficulty is increased. In order to compensate the asymmetrical force, different depressure ratios of the first hydraulic half-bridge 330 and the second hydraulic half-bridge 370 can be set such that PS'S1–PA'S2=0 when Ps is equal to PA.

Because the first hydraulic half-bridge 330 reduces the pressure input to the housing, the drive device 31 controls the pressure PA of the outlet 357 as a predetermined value by a relatively small output force. Consequently, a volume of the entire pressure-following valve can be reduced.

Figure 3:
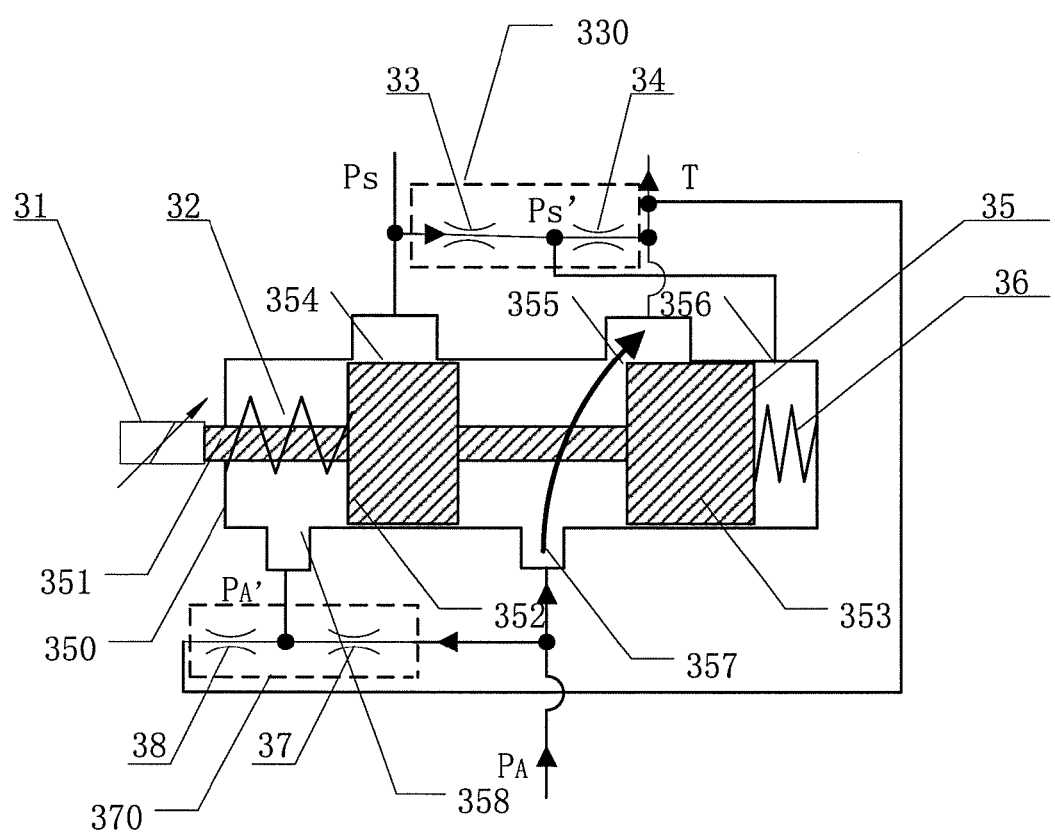
FIG. 3 is a view in which a spool of the pressure-following valve shown in FIG. 2 is at the right side.
Figure 4:
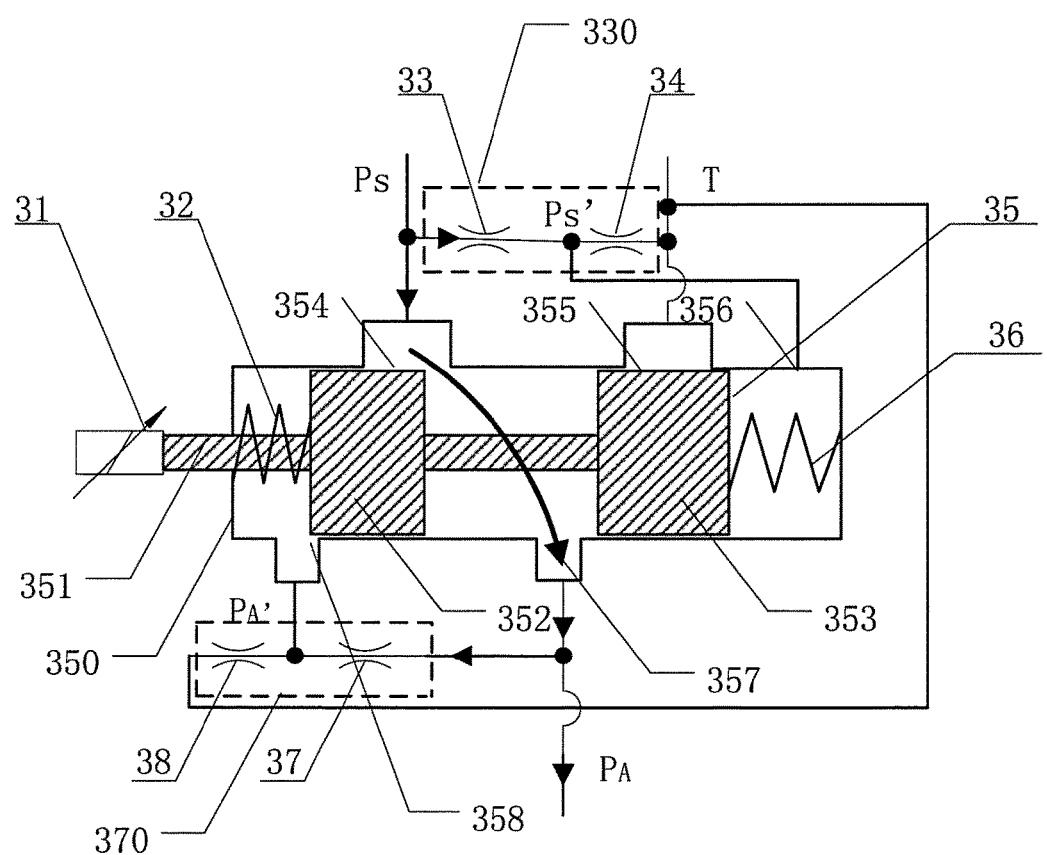
FIG. 4 is a view in which the spool of the pressure-following valve shown in FIG. 2 is at the left side.

FIG. 3 is a view in which the spool of the pressure-following valve shown in FIG. 2 is at the right side, and FIG. 4 is a view in which the spool of the pressure-following valve shown in FIG. 2 is at the left side.

Referring to FIGS. 2-4, the working state of the pressure-following valve of the present embodiment will be depicted below.

The spool is in a neutral position as shown in FIG. 2 when the pressure-following valve starts working.

When the pressure PA to be output is a predetermined value, an output thrust of the drive device 31 can be adjusted to reach the predetermined value PA.

Provided that the spool 35 is moved to the right side (as shown in FIG. 3) under action of the thrust FM and the joint force FK of the first spring 32 and the second spring 36, the outlet 357 communicates with the external tank T, and the pressure PA of the outlet 357 will be decreased, meanwhile the pressure PA' of the feedback port 358 is decreased, resulting in leftward movement of the spool and reduction of a force applied to the first plug body 352 in the rod chamber in a right direction.

When the spool is pushed to the right position as shown in FIG. 4, the outlet 357 communicates with the first inlet 354, such that the pressure PA of the outlet 357 will be increased, and meanwhile the pressure PA' of the feedback port 358 is increased, resulting in rightward movement of the spool and increase of a force applied to the first plug body 352 in the rod chamber in a right direction.

Finally, the spool 35 will be stabilized in a position where the outlet pressure PA is equal to the predetermined value through the above adjusting process.

It can be seen from the above illustration that the pressure PA of the outlet 357 can be controlled by setting the thrust of the drive device 31. If the pressure PA of the outlet 357 is higher than the predetermined value, the spool 35 is moved rightward, and the pressure PA of the outlet 357 is decreased till a balance is maintained. Similarly, if the pressure PA of the outlet 357 is lower than the predetermined value, the spool 35 is moved leftward, and the pressure PA of the outlet 357 is increased till a balance is maintained.

In this case, an output force of the execution mechanism 31 can be adjusted quantitatively to further adjust quantitatively the inclination angle of the swashplate of the variable displacement hydraulic pump 2.

Figure 5:
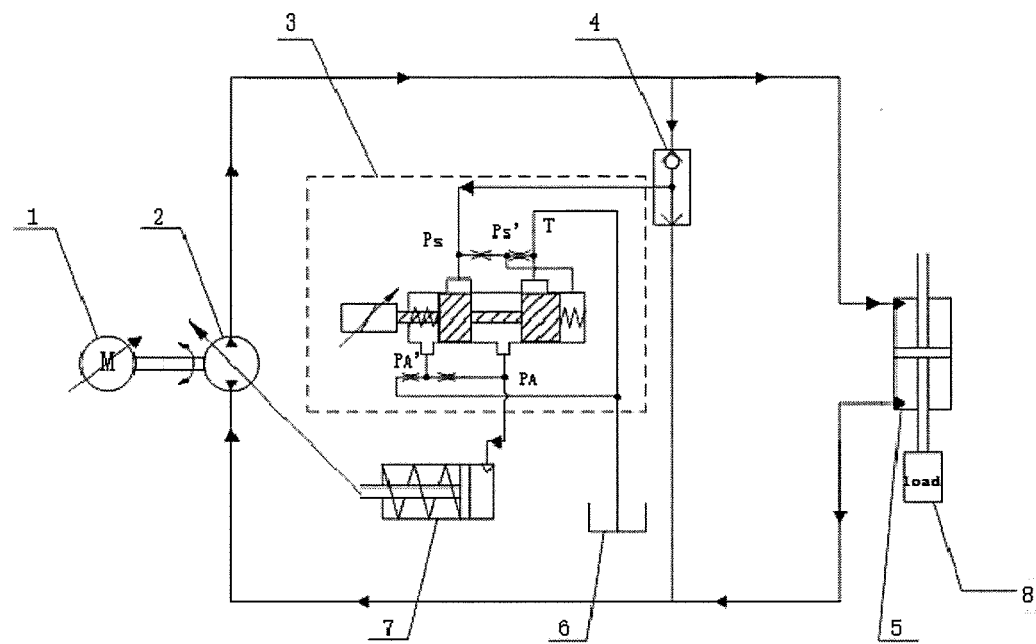
FIG. 5 shows a flowing direction of liquid in the smart load-sensing EHA shown in FIG. 1 when an adjustable-speed motor rotates in a first direction.
Figure 6:
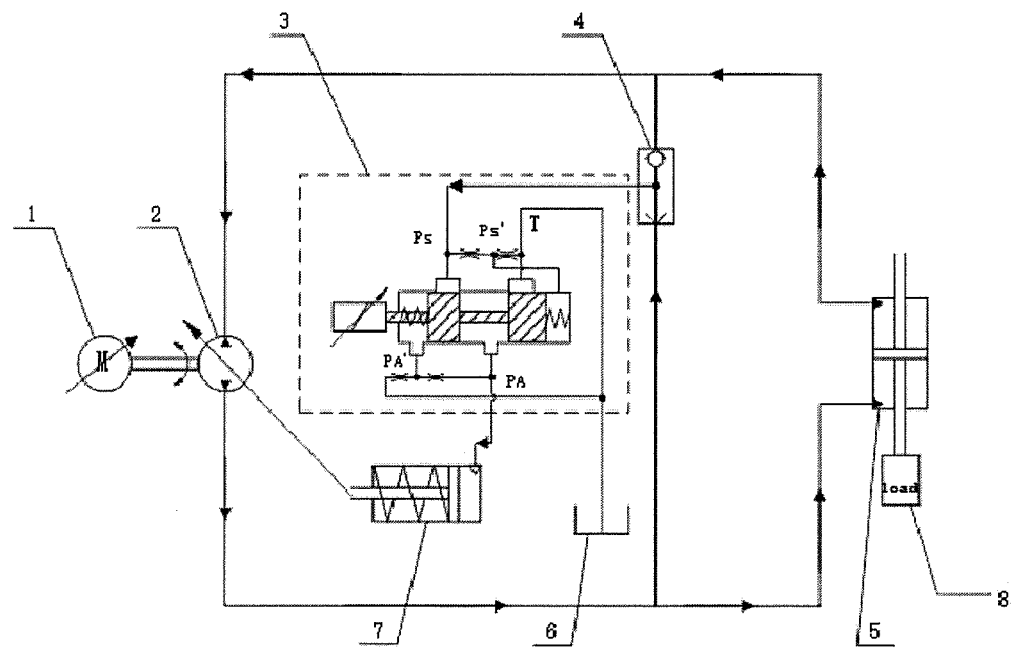
FIG. 6 shows a flowing direction of liquid in the smart load-sensing EHA shown in FIG. 1 when the adjustable-speed motor rotates in a second direction opposite to the first direction.

FIG. 5 shows a flowing direction of liquid in the smart load-sensing EHA shown in FIG. 1 when the adjustable-speed motor rotates in a first direction. FIG. 6 shows a flowing direction of liquid in the smart load-sensing EHA shown in FIG. 1 when the adjustable-speed motor rotates in a second direction opposite to the first direction.

As shown in FIG. 5, when the motor 1 rotates in the first direction, an upper end of the variable displacement hydraulic pump 2 is embodied as an oil outlet and a lower end thereof is embodied as an oil inlet. Then, downward movement of the symmetrical plug of the symmetrical hydraulic cylinder 5 results in increase in the volume of the first cylinder (which is the upper portion of the symmetrical hydraulic cylinder 5 in FIG. 5) of the symmetrical hydraulic cylinder 5 and decrease in the volume of the second cylinder (which is the lower portion of the symmetrical hydraulic cylinder 5 in FIG. 5) thereof, and further the first cylinder has a lower pressure than the second cylinder. A pressure signal of the second cylinder is acquired by the shuttle valve and input to the single-acting hydraulic cylinder 6 via the pressure-following valve 3 such that a cavity pressure of the single-acting hydraulic cylinder 6 increases. With a joint force of the pressure of the liquid in the cavity and the elastic force of the spring, the asymmetrical plug moves leftward to decrease the inclination angle of the swashplate of the variable displacement hydraulic pump 2 and decrease the displacement of the variable displacement hydraulic pump 2. At the same time, the power output to the load is ensured constant by increasing the speed of the adjustable-speed motor 1. In this way, an output torque of the adjustable-speed motor 1 is decreased, and consequently current thereof is reduced to further reduce copper loss and heat of the adjustable-speed motor 1.

Similarly, when the adjustable-speed motor 1 rotates in the second direction, a lower end of the variable displacement hydraulic pump 2 is embodied as an oil outlet and an upper end thereof is embodied as an oil inlet. Then, upward movement of the symmetrical plug of the symmetrical hydraulic cylinder 5 results in increase in the volume of the second cylinder (which is the lower portion of the symmetrical hydraulic cylinder 5 in FIG. 6) of the symmetrical hydraulic cylinder 5 and decrease in the volume of the first cylinder thereof (which is the upper portion of the symmetrical hydraulic cylinder 5 in FIG. 6), and further the second cylinder has a lower pressure than the first cylinder. A pressure signal of the first cylinder is acquired by the shuttle valve and input to the single-acting hydraulic cylinder 6 via the pressure-following valve 3 such that a cavity pressure of the single-acting hydraulic cylinder 6 increases. With a joint force of the pressure of the liquid in the cavity and the elastic force of the spring, the asymmetrical plug moves leftward to decrease the inclination angle of the swashplate of the variable displacement hydraulic pump 2 and decrease the displacement of the variable displacement hydraulic pump 2. At the same time, the power output to the load is ensured constant by increasing the speed of the adjustable-speed motor 1. In this way, an output torque of the adjustable-speed motor 1 is decreased, and consequently current thereof is reduced to further reduce copper loss and heat of the adjustable-speed motor 1.

In addition, the inclination angle of the swashplate of the variable displacement hydraulic pump 2 can be adjusted quantitatively as needed because the output pressure can be adjusted according to the output force of the drive device 31 of the pressure-following valve 3.

By virtue of the smart load-sensing EHA of the present invention, the displacement of the variable displacement hydraulic pump 2 can be adjusted quantitatively by controlling the output pressure of the pressure-following valve 3 to further reduce the radiation and energy loss of the entire system.

The above is a detailed illustration of some embodiments of the present invention. As understood by an ordinary skilled in the art, all or any step or component of the method and apparatus of the present invention can be achieved by means of a software, a hardware or combination thereof in any computing device (including a processor, a memory medium and the like) or a network of the computing device by the ordinary skilled in the art with basic programming skills in the case of knowing the content of the present invention, and thus it is not necessary to give detailed illustration herein.

Besides, apparently, when the above illustration involves possible external operations, any display means, any input means, a corresponding interface and control program connected to any computing device have to be used. In a word, a computer, a computer system or related hardware, software in a computer network and a hardware, software or combination thereof that achieve the above operations of the present invention consist of the apparatus and components thereof in the present invention.

Therefore, in view of the above understanding, the objective of the present invention can be realized by running a program or a group of programs in any information processing apparatus which may be a known general apparatus. As a result, the objective of the present invention can be achieved only by providing a program product that contains a program code for achieving the method or apparatus of the invention. That is to say, the program product consists of the present invention, and a medium that stores or transmits the program product is also comprised of the present invention. Apparently, the storing or transmitting medium is a medium known by an ordinary skilled in the art or any type of storing or transmitting medium developed in the future. Consequently, it is not necessary to take all the examples of the storing or transmitting medium herein.

In the apparatus and method of the present invention, the components or steps can be decomposed, combined and/or re-combined after decomposition. The decomposition and/or recombination shall be considered as being equivalent to the technical solution of the present invention. It further should be noted that the steps performing the above operations can be followed naturally and chronologically according to the sequence of the illustration, but do not have to be executed chronologically. Some steps can be performed simultaneously or separately. Meanwhile, in the above depiction of the present invention, the features described and/or shown in an embodiment may be used in one or more other embodiments in an identical or similar way, or may be combined with the features of other embodiments or may replace the features of other embodiments.

It should be stressed that the term "include/contain" used herein refers to existence of a feature, an element, a step or an assembly, but does not exclude existence or addition of one or more other features, elements, steps or assemblies.

Although the present invention and its advantages have been described in detail, it should be understood that various changes, substitutions, and alterations can be made without departing from the spirit and scope of the invention as defined by the following claims. Furthermore, the scope of the present invention is not limited to the embodiments of the process, apparatus, means, method and step set forth in the description. From the disclosure of the present invention, an ordinary skilled in the art can understand easily that a process, an apparatus, means, a method or a step currently available or to be developed in the future that basically realizes the same function or produces the same result as the corresponding embodiments in the present invention can be used as well. Therefore, it is the intent of the annexed claims that such a process, apparatus, means, method or step is encompassed within their scope.

What is claimed is:

1. A smart load-sensing EHA, comprising a variable displacement hydraulic pump, a symmetrical hydraulic cylinder, a feedback module, a pressure-following valve and an execution mechanism;
the symmetrical hydraulic cylinder includes a symmetrical plunger, a first cylinder and a second cylinder separated by the plunger;
the variable displacement hydraulic pump includes an oil inlet and an oil outlet connected with the first cylinder and the second cylinder, respectively;
the feedback module includes a first input, a second input and an output, the first input and the second input being connected with the first cylinder and the second cylinder, respectively, the output being used to output a greater one of the pressures at the first input and the second input to the execution mechanism;
the pressure-following valve is connected between the output of the feedback module and an input end of the execution mechanism to reduce an instantaneous flow input to the input end of the execution mechanism;
the input end of the execution mechanism is connected to the output of the pressure-following valve, and the output end of the execution mechanism is connected to the variable displacement hydraulic pump; the execution mechanism is used to receive an output of the feedback module and generate a signal for changing a displacement of the variable displacement hydraulic pump,
wherein the execution mechanism is a single-acting hydraulic cylinder, the single-acting hydraulic cylinder includes a cylinder body, an asymmetrical plunger and a spring inside the cylinder body;
the asymmetrical plunger includes a first shaft and a first plug perpendicular to each other;
the first plug fits with an inner wall of the cylinder body to form a cavity having an opening connected to an output of a damping orifice;
the spring is arranged inside a cavity with the first shaft of the single-acting hydraulic cylinder and has an elastic direction overlapping with an axis of the first shaft, and works in a non-tensile state;
one end of the first shaft is fixedly connected with the first plug and the other end is connected with the variable displacement hydraulic pump to change a displacement of the variable displacement hydraulic pump according to a joint force of a pressure applied to the first plug by liquid into the cavity and a pressure applied to the first plug by the spring.

2. The smart load-sensing EHA according to claim 1, wherein the feedback module is a shuttle valve.

3. The smart load-sensing EHA according to claim 2, further comprising an adjustable-speed motor;
the adjustable-speed motor is connected to the variable displacement hydraulic pump to drive the latter.

4. The smart load-sensing EHA according to claim 1, wherein the variable displacement hydraulic pump includes a swashplate having an inclination angle in positive correlation with the displacement of the variable displacement hydraulic pump;
the first shaft of the single-acting hydraulic cylinder is connected to the swashplate of the variable displacement hydraulic pump to change the displacement of the variable displacement hydraulic pump by changing the inclination angle of the swashplate.

5. The smart load-sensing EHA according to claim 4, further comprising an adjustable-speed motor;
the adjustable-speed motor is connected to the variable displacement hydraulic pump to drive the latter.

6. The smart load-sensing EHA according to claim 1, further comprising an adjustable-speed motor;
the adjustable-speed motor is connected to the variable displacement hydraulic pump to drive the latter.

7. The smart load-sensing EHA according to claim 1, further comprising an adjustable-speed motor;
the adjustable-speed motor is connected to the variable displacement hydraulic pump to drive the latter.

8. The smart load-sensing EHA according to claim 7, wherein the pressure-following valve includes a housing, a spool located in the housing and a first hydraulic half-bridge;
wherein the spool is an asymmetrical plunger and includes a second shaft extending beyond the housing and a second plug fixedly connected with the second shaft and located inside the housing, the second plug being provided with a circumferential groove which divides the second plug into a first plug body and a second plug body; a clearance-fit is created by the first plug body, the second plug body and the housing;
the spool divides the housing into a rod chamber containing the shaft, a middle chamber between the first plug body and the second plug body, and a rodless chamber;
the housing is provided with a first inlet, a second inlet, and a third inlet;
the first inlet is connected to an output of the feedback module, and the second inlet is connected to an external tank;
the first inlet is connected with a first end of the first hydraulic half-bridge, the second inlet being connected with a second end thereof, the third inlet being connected with an intermediate end thereof to input external input pressure into the rodless chamber after pressure depressure;
the housing is also provided with an outlet connected to the input end of the execution mechanism, and a feedback port for feeding back pressure of the outlet to the rod chamber.

9. The smart load-sensing EHA according to claim 8, wherein the first hydraulic half-bridge includes a first throttling orifice and a second throttling orifice connected in series;
the first inlet is connected to a first end of the first throttling orifice;
the third inlet is connected to a second end of the first throttling orifice and a first end of the second throttling orifice;
the second inlet is connected to a second end of the second throttling orifice.

10. The smart load-sensing EHA according to claim 9, wherein the pressure-following valve further includes a second hydraulic half-bridge;
the second hydraulic half-bridge includes a third throttling orifice and a fourth throttling orifice connected in series;
a first end of the third throttling orifice is connected with the outlet;

a second end of the third throttling orifice and a first end of the fourth throttling orifice are connected with the feedback port;

the second end of the fourth throttling orifice is connected with the external tank.

11. The smart load-sensing EHA according to claim 10, wherein the pressure-following valve further includes a drive device;

the drive device applies an axial force to the second shaft in an axial direction of the spool and adjusts an output pressure of the outlet based on the axial force.

12. The smart load-sensing EHA according to claim 11, wherein the drive device is a proportional electromagnet or a voice coil motor.

13. The smart load-sensing EHA according to claim 8, wherein the pressure-following valve further includes a first spring arranged in the rod chamber and a second spring arranged in the rodless chamber;

the first spring and the second spring have an elastic direction overlapping with an axis of the spool;

the first spring and the second spring operate in a non-tensile state.

\* \* \* \* \*